United States Patent [19]

Abe

[11] Patent Number: 5,138,668
[45] Date of Patent: Aug. 11, 1992

[54] CHARACTER DISCRIMINATION SYSTEM EMPLOYING HEIGHT-TO-WIDTH RATIO AND VERTICAL EXTRACTION POSITION INFORMATION

[75] Inventor: Keiko Abe, Kanagawa, Japan

[73] Assignee: Sony Corporation, Tokyo, Japan

[21] Appl. No.: 742,449

[22] Filed: Aug. 5, 1991

Related U.S. Application Data

[63] Continuation of Ser. No. 352,129, May 15, 1989, abandoned.

[30] Foreign Application Priority Data

May 19, 1988 [JP] Japan .................. 63-122272

[51] Int. Cl.$^5$ .................................. G06K 9/34
[52] U.S. Cl. ........................... 382/9; 382/13; 382/48
[58] Field of Search .................. 382/9-13, 382/34, 48

[56] References Cited

U.S. PATENT DOCUMENTS

| | | |
|---|---|---|
| 3,846,752 | 11/1974 | Nakano et al. . |
| 4,045,773 | 8/1977 | Kadota et al. . |
| 4,162,482 | 7/1979 | Su . |
| 4,193,056 | 3/1980 | Morita et al. . |
| 4,284,975 | 8/1981 | Odaka . |
| 4,317,109 | 2/1982 | Odaka et al. . |
| 4,365,234 | 12/1982 | Henrichon, Jr. .................. 382/9 |
| 4,377,803 | 3/1983 | Lotspiech et al. . |
| 4,527,283 | 7/1985 | Ito et al. . |
| 4,562,594 | 12/1985 | Bednar et al. .................. 382/9 |
| 4,594,732 | 6/1986 | Tsuji . |
| 4,610,025 | 9/1986 | Blum et al. . |
| 4,635,290 | 1/1987 | Tsuji et al. .................. 382/9 |
| 4,932,065 | 6/1990 | Feldgajer .................. 382/9 |
| 4,933,977 | 6/1990 | Ohnishi et al. .................. 382/9 |
| 4,959,868 | 9/1990 | Tanioka .................. 382/9 |

FOREIGN PATENT DOCUMENTS

| | | |
|---|---|---|
| PCT/US80/-00575 | 6/1979 | European Pat. Off. . |
| 1144319 | 3/1969 | United Kingdom . |
| 1337159 | 11/1973 | United Kingdom . |
| 1442273 | 7/1976 | United Kingdom . |
| 2182796A | 5/1987 | United Kingdom . |

*Primary Examiner*—Jose Couso
*Attorney, Agent, or Firm*—Philip M. Shaw, Jr.

[57] ABSTRACT

A character recognition system which is improved in accuracy of integration for discrete characters. The system discriminate a component of any discrete character in accordance with a height-to-width ratio and a vertical extraction position of a rectangular area which is formed from a character row signal delivered to the system. Rectangular areas or character areas to be integrated are decided in accordance with an average character pitch of square or em characters.

8 Claims, 5 Drawing Sheets

FIG.4(A)     FIG.4(B)     FIG.4(C)
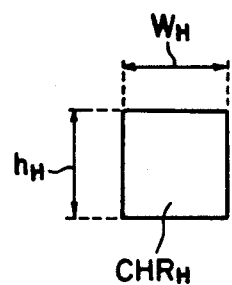
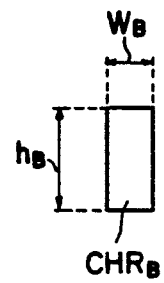
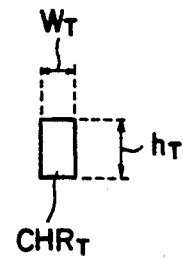
FIG.5
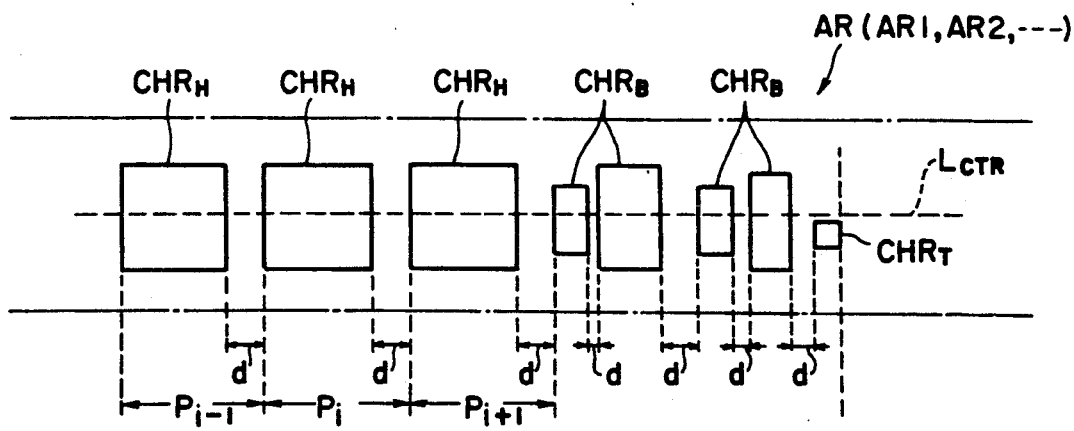

CHARACTER DISCRIMINATION SYSTEM EMPLOYING HEIGHT-TO-WIDTH RATIO AND VERTICAL EXTRACTION POSITION INFORMATION

This is a continuation of co-pending application Ser. No. 07/352,129 filed on May 15, 1989 now abandoned.

BACKGROUND OF THE INVENTION

This invention relates to a character recognition system, and more particularly to a character recognition system by which a character area can be extracted efficiently.

It is a peculiar problem, for example, to Japanese characters including "kanji" and "kana" characters to discriminate discrete characters exactly in order to recognize individual characters out of horizontally or vertically written character lines.

An exemplary approach to the problem is disclosed, for example, in U.S. Pat. No. 4,850,025, wherein rectangular areas are imaginarily formed from projection data obtained from a horizontal or vertical character line such that each of them may circumscribe a single entire character or a component of a character, and adjacent ones of such rectangular areas are integrated until the height-to-width ratio of each of the thus integrated areas becomes substantially equal to 1, thereby extracting individual discrete characters.

In this connection, most of the Japanese characters in the form of em characters present, when they are each circumscribed by a rectangular frame, a height-to-width ratio substantially equal to 1. In the case of discrete characters such as " " and " " where character components constituting a single character are horizontally disconnected and discrete from each other, it is considered that, if two or more adjacent character components are integrated such that a rectangular area which circumscribes the character components may have a height-to-width ratio substantially equal to 1, then they can be extracted as a single discrete character.

Practically, however, if the height-to-width ratio of such rectangular area is strictly examined for discrete characters obtained by the integration, the height-to-width ratios may not be uniform with all of the discrete characters. Therefore, the method described above is not satisfactory for practical use in accuracy of extraction of discrete characters.

OBJECTS AND SUMMARY OF THE INVENTION

It is an object of the present invention to provide a novel character recognition system which eliminates such drawbacks of the conventional systems as described above.

It is another object of the present invention to provide a character recognition system which is improved in accuracy of integration for discrete characters.

In order to attain the objects, according to one aspect of the present invention, there is provided a process of recognizing a character in accordance with character information extracted from a character row signal using a rectangular area which is formed from the character row signal and circumscribes a complete character or a component of a discrete character, which comprises the step of judging that the rectangular area is a component of a discrete character in accordance with a height-to-width ratio and a vertical extraction position of the rectangular area.

According to another aspect of the present invention, there is provided a process of recognizing a character in accordance with character information extracted from a character row signal using a rectangular area which is formed from the character row signal and circumscribes a complete character or a component of a discrete character, which comprises the steps of judging that the character area is a component of a discrete character in accordance with a height-to-width ratio and a vertical extraction position of the character area, judging, when it is judged that the first rectangular area is a component of a discrete character, that a second adjacent character area is another component of the discrete character, integrating the second character area with the first character area under the condition that the character pitch of the integrated character areas do not exceed an average character pitch, and discriminating the character information extracted from the integrated first and second character areas as character information of the components of the discrete character.

According to a further aspect of the present invention, there is provided a character recognition system which recognizes a character in accordance with character information extracted from a character row signal using a rectangular area which is formed from the character row signal and circumscribes a complete character or a component of a discrete character, which comprises means for judging that the rectangular area is a component of a discrete character in accordance with a height-to-width ratio and a vertical extraction position of the rectangular area.

According to a still further aspect of the present invention, there is provided a character recognition system which recognizes a character in accordance with character information extracted from a character row signal using a rectangular area which is formed from the character row signal and circumscribes a complete character or a component of a discrete character, which comprises means for judging that the rectangular area is a component of a discrete character in accordance with a height-to-width ratio and a vertical extraction position of the rectangular area, means for judging, when it is judged that the first rectangular area is a component of a discrete character, that a second adjacent character area is another component of the discrete character, means for integrating the second character area with the first character area under the condition that the character pitch of the integrated character areas does not exceed an average character pitch, and means for discriminating the character information extracted from the integrated first and second character areas as character information of the components of the discrete character.

With the character recognition processes and systems of the present invention, a component of any discrete character is discriminated in accordance with a height-to-width ratio and a vertical extraction position of the rectangular area. Accordingly, extraction accuracy of a discrete character is improved.

Besides, where rectangular areas or character areas to be integrated are decided in accordance with an average character pitch of square or em characters, extraction accuracy of any discrete character is improved to a greater extent.

In addition, it is possible to realize an expedited operation in the character recognition process and system as a whole.

The above and other objects, features and advantages of the present invention will become apparent from the following description and the appended claims, taken in conjunction with the accompanying drawings.

BRIEF DESCRIPTION OF THE DRAWINGS

FIGS. 3, 4A, 4B and 4C and 5 are schematic diagrams illustrating extraction of characters;

DETAILED DESCRIPTION OF THE PREFERRED EMBODIMENT

Figure 1:
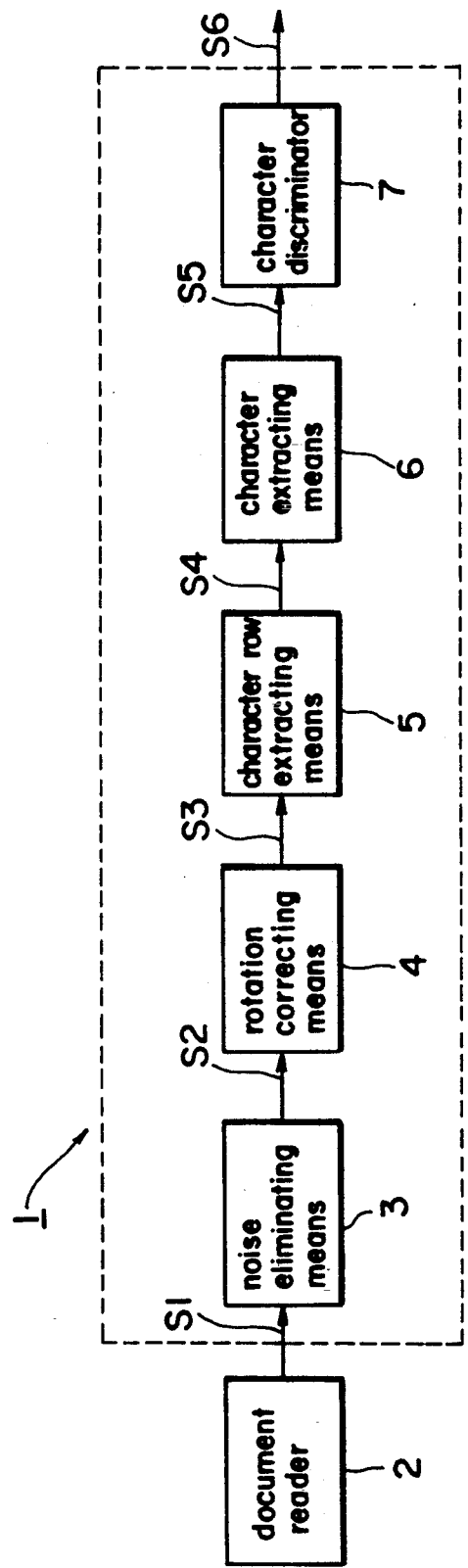
FIG. 1 is a block diagram of a character recognition system showing a preferred embodiment of the present invention.

Referring first to FIG. 1, a character recognition system 1 is connected to a document image reader 2 and receives an image signal S1 produced by the document reader 2. The character recognition system 1 includes a pre-processing section including a noise eliminating means 3 and a rotation correcting means 4, a character area processing section including a character row extracting means 5 and a character extracting means 6, and a character discriminator 7. The noise eliminating means 3 receives an input image signal S1 from the document image reader 2 and removes from the input image signal S1 noise images such as isolated points included in the document image read by the document image reader 2 so that isolated points or the like are not erroneously recognized as part of a character or characters. The noise eliminating means 3 thus delivers a noise-free image signal S2 to the rotation correcting means 4.

Upon reception of such noise-free image signal S2, the rotation correcting means 4 corrects rotation of the read document on a plane and delivers a corrected image signal S3 to the character row extracting means 5.

The character row extracting means 5 separates the printed document into a character area and other areas (e.g. photograph, drawing and so forth) and then extracts only image character data included in the character area. Then, the character row extracting means 5 confirms that character lines included in the character area are laterally arranged rows, extracts the character rows and delivers a signal S4 representative of the character rows.

The character extracting means 6 receives the character row signal S4 from the character row extracting means 5 and extracts from the character row signal S4 non-discrete ordinary characters and special characters in the form of em characters while it also extracts discrete characters making use of an integration technique as is required. The character extracting means 6 delivers data of the thus extracted characters as input character data S5 to the character discriminator 7.

The character discriminator 7 has a dictionary of standard characters relative to all of the object characters for discrimination therein and selects a standard character having the most similar features to those of the input character data S5. The character discriminator 7 thus delivers data S6 of thus recognized character as an output of the character recognition system 1.

Figure 2:
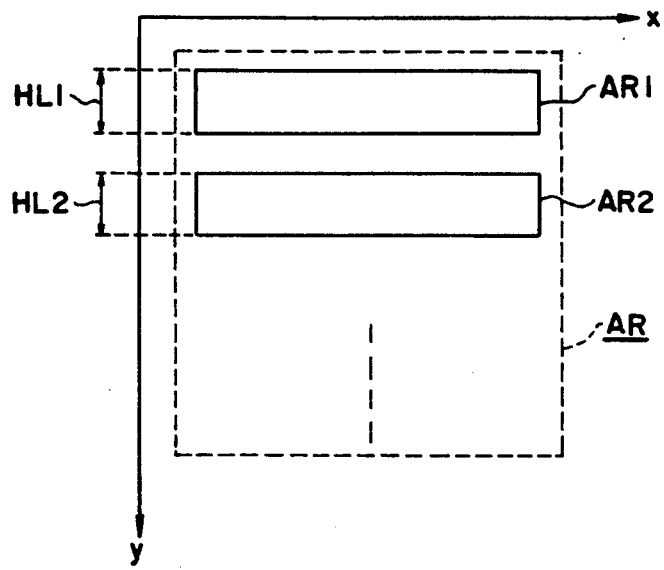
FIG. 2 is a schematic diagram illustrating extraction of a character row.

Extraction of character rows by the character row extracting means 5 is executed in the following manner. Referring to FIG. 2, where the position of each dot in a character area AR is represented by x-y coordinates wherein the x-axis extends in the horizontal direction and the y-axis extends in the vertical direction, the sums of dots of the logic "1" level in the form of dots constituting black characters included in the character area AR are taken in directions parallel to the x-axis and projected on the y-axis to produce a y-projection signal Sy which will be hereinafter referred to as y-projection.

The signal level of the y-projection signal Sy is "0" at any position between adjacent character rows AR1, AR2, . . . because there is no black character portion. To the contrary, at any position on the y-axis corresponding to the character rows AR1, AR2 and so forth, the signal level corresponds to a total number of dots on the line passing the point on the y-axis and extending parallel to the x-axis. Thus, the y-projection signal Sy is compared with a predetermined threshold level to consequently obtain character row extraction data CL which presents the logic "1" level in any region where the level of the signal Sy is higher than the threshold level.

Using such character row extraction data CL, the character row extracting means 5 extracts those portions of the corrected image signal S3 delivered from the rotation correcting means 4 which correspond to timings at which the character row extraction data CL presents the logic "H" level. The character row extracting means 5 thus delivers the extracted signal portions as a character row signal S4 indicative of the individual character rows AR1, AR2 and so forth.

Thus, any region where the character row extraction data CL presents the logic "1" level has a maximum height HL (HL1, HL2, . . . ) of the character row AR1, AR2, . . . , and any vertical position in the y-axis direction of a character included in any character row is within the maximum height HL of the relevant character row.

Figure 3:
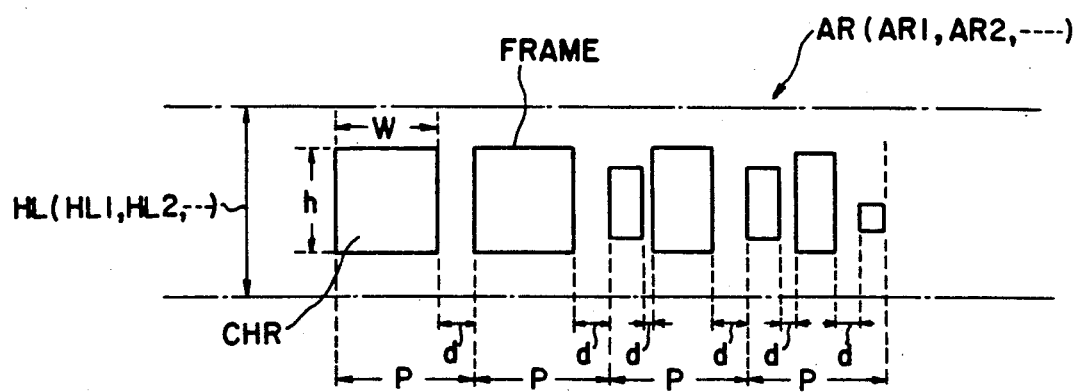

The character extracting means 6 receives the character row signal S4 and executes such a processing that it detects, with respect to both x-axis and y-axis directions, the positions and ranges where characters and components of discrete characters exist in the individual character rows AR1, AR2 and so forth to extract each of the positions and ranges as a rectangular area CHR surrounded by a circumscribing frame FRAME which circumscribes a complete character or a component of a character as illustrated in FIG. 3.

Practically, such extraction process is executed such that x-projection is performed in the y-axis direction corresponding to the character height direction and y-projection is performed in the x-axis direction corresponding to the character width direction to obtain an x-projection signal Sx and a y-projection signal Sy, and the x- and y-projection signals Sx and Sy are compared with a predetermined threshold level to detect positions of the circumscribing frames FRAME in both x- and y-axis directions.

When the Japanese characters are thus extracted by such process as described just above, where they are assorted in accordance with the height-to-width ratio h/w, three different types of rectangular areas CHR (=$CHR_H$, $CHR_B$, $CHR_T$) are obtained as illustrated in FIGS. 4A, 4B and 4C, respectively.

The first rectangular area $CHR_H$ presents height-to-width ratio $h_H/w_H$ substantially equal to 1 as given by $$\frac{h_H}{w_H} \quad (1)$$

Such rectangular area $CHR_H$ is provided by ordinary characters of the non-discrete square or em-character type which have no such discontinuity as in a discrete character and have no special fixed feature with regard to its size and shape. Such ordinary characters will be hereinafter referred to as non-discrete ordinary characters, and most of the Japanese characters belong to such non-discrete ordinary characters.

The rectangular area $CHR_B$ makes a component of a discrete character and presents a height-to-width ratio $h_B/w_B$ greater than 1 as given by $$\frac{h_B}{w_B} > 1 \quad (2)$$

Such rectangular area $CHR_B$ is provided by components of discrete characters and vertically elongate special characters and has a tendency that the position thereof in the character height direction is substantially at the center with respect to the maximum height HL.

The third rectangular area $CHR_T$ has no particular fixed feature in its height-to-width ratio $h_T/w_T$, but the height $h_T$ and the width $w_T$ thereof are comparatively small, and the position thereof in the character height direction is not at the vertical center with respect to the maximum height HL. Some special characters such as "", ",", ".⇌ and so forth belong to the third type.

Actually, rectangular areas CHR (FIG. 3) obtained by an extracting operation of characters from each of the character rows AR1, AR2, and so forth present a random arrangement within the maximum height HL of the relevant character row. In particular, rectangular areas $CHR_H$ of non-discrete ordinary characters, rectangular areas $CHR_B$ of some special characters or components of discrete characters, and rectangular areas $CHR_T$ of special characters may be arranged successively at random in the x-axis direction in each character row.

The character extracting means 6 properly discriminates between the types of such normal characters and special characters out of the arrangement of rectangular areas CHR obtained per line. Then, if there exists any discrete character, an average character pitch P given by the following equation $$P = \frac{1}{n} \sum_{i=1}^{n} P_i \quad (3)$$

is used for the purpose of exactly extracting such character.

As illustrated in FIG. 5, pitches ... $P_{i-1}$, $P_i$, $P_{i+1}$, ..., from which the average character pitch P is to be calculated are provided by those of square characters wherein the height-to-width ratio h/w is substantially equal to 1 as in a non-discrete ordinary character ($h_H/w_H=1$). Meanwhile, the other pitches of special characters and components of discrete characters wherein the height-to-width ratio h/w is not substantially equal to 1 ($h_B/w_B\neq1$ and $h_T/w_T=\neq1$) or of special characters wherein the height-to-width ratio $h_T/w_T$ is substantially equal to 1 but the size thereof is small are excluded from the calculation of an average character pitch P in accordance with the equation (3) above.

This is intended to execute a proper integration processing of a discrete character in such a manner that the pitch of the discrete character obtained as a result of the integration processing may be substantially equal to the average character pitch of the square or em characters.

It is to be noted that, in case a space d between adjacent rectangles is smaller than a predetermined threshold value, the rectangles are processed as rectangles of a single square character by a so-called blurring processing.

In the case of the present embodiment, when the first character row AR1 in the character area AR (FIG. 2) is integrated, the character extracting means 6 adopts a maximum height HL1 of the first character row as the average character pitch P as given by the equation (3) above. Then, in processing of any of the following character rows, the character extracting means 6 executes a calculation of the equation (3) using a square character pitch Pi of the preceding character row to find out an average character pitch P.

The above procedure is based on the reason that, in regard to the first character row, it is impossible to obtain an average character pitch by calculation.

Figure 6:
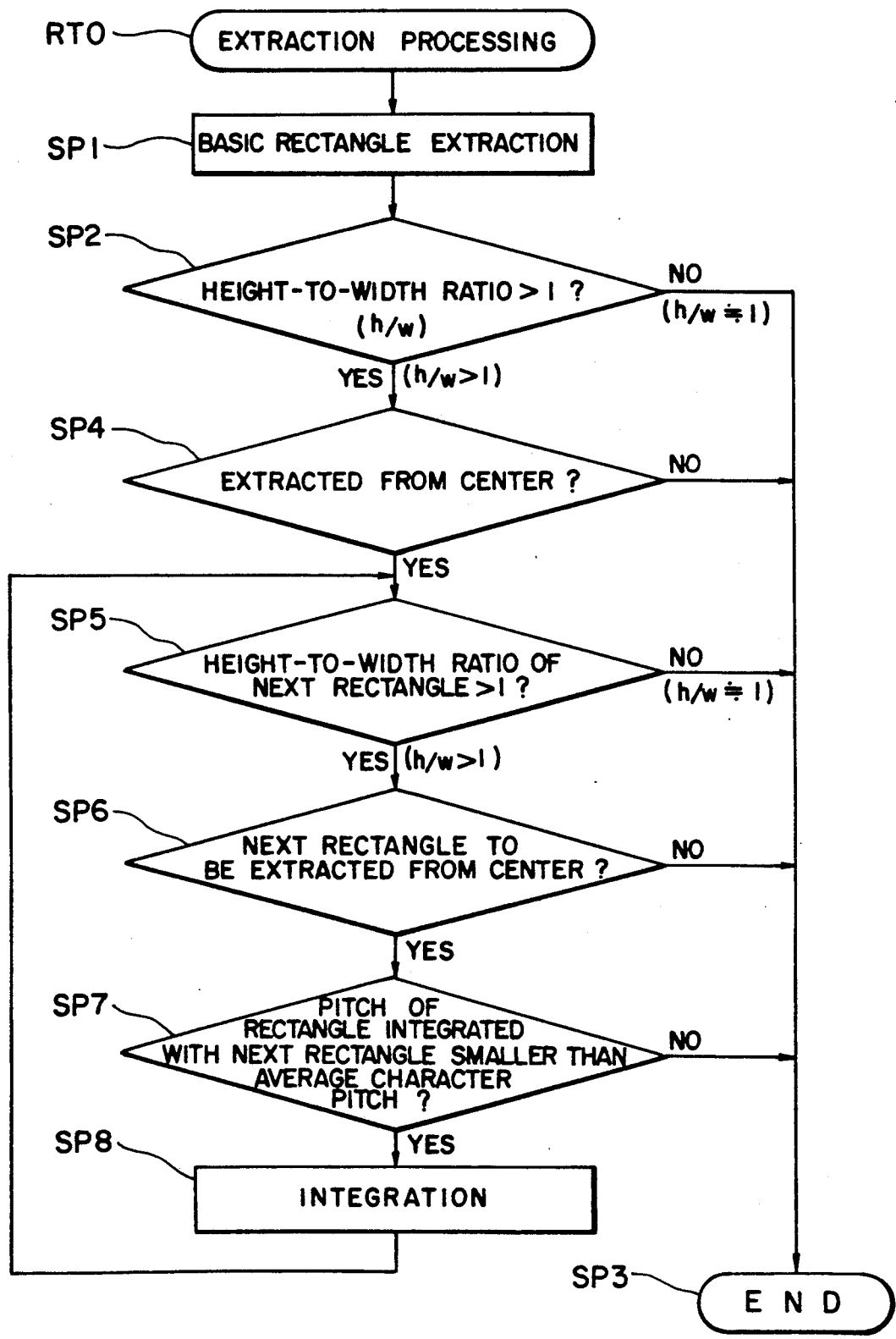
FIG. 6 is a flow chart showing the procedure of an extracting processing by the character recognition system shown in FIG. 1.

The character extracting means 6 executes such an extraction processing program RTO as shown in FIG. 6 in order to extract characters from each of the character rows AR1, AR2 and so forth. After the extraction processing program RTO is entered, the character extracting means 6 executes a basic square extracting processing for each of the character rows AR1, AR2 and so forth in a step SP1 to generate a row of such rectangles as shown in FIGS. 4A, 4B and 4C wherein rectangular areas CHR are arranged sequentially in the x-axis direction with rectangular spaces d left therebetween. After then, the character extracting means 6 executes such an integration processing as shown in FIGS. 7 and 8A to 8C successively for the first, second and successive rectangular areas CHR constituting the relevant rectangle row.

In particular, in a step SP2, the character extracting means 6 makes a decision as to whether or not the height-to-width ratio h/w of a rectangular area CHR, the first rectangular area of the relevant rectangle row in this instance, is greater than 1. When the result of such decision is negative, this signifies that the relevant area CHR belongs to a character which has a height-to-width ratio h/w substantially equal to 1 such as a discrete square character or a special character of a small size. In this instance, the character extracting means 6 terminates the extraction processing program in a step SP3 and delivers the character data of the thus processed rectangular area CHR as input character data S5 to the character discriminator 7.

To the contrary, if the result of the decision obtained in the step SP2 is affirmative, this signifies that the height-to-width ratio h/w of the rectangular area CHR is greater than 1 and therefore the area CHR may possibly be a component of a discrete character as described hereinabove in connection with the equation (2) above. In this case, the character extracting means 6 proceeds to a step SP4 and makes a decision as to whether or not the vertical position of the extracted rectangular area CHR is at the center.

The step SP4 is provided to judge whether a relevant rectangular area CHR belongs to a discrete character or a special character, and when the result of such decision is negative, this signifies that the rectangular area CHR is above or below a center line $L_{CTR}$ passing through the center position of the maximum height HL of the relevant character row as seen at a rectangular area $CHR_{X1}$ or $CHR_{X2}$ in FIG. 7.

Such condition is satisfied not by a discrete character but by a special character such as "''", "," and ".".

When the condition is satisfied, the character extracting means 6 proceeds to the step SP3 to terminate the processing program and delivers the character data of the processed rectangular area CHR as input character data S5 to the character discriminator 7.

Figure 7:
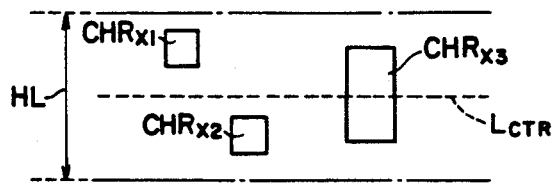
FIGS. 7 and 8A, 8B and 8C are schematic diagrams illustrating an integrating processing of a discrete character.

To the contrary, if the result of the decision in the step SP4 is affirmative, this signifies that the rectangular area CHR is at a position astride the center line $L_{CTR}$, as seen at a rectangular area $CHR_{X3}$ in FIG. 7.

Such character is regarded as a component of a discrete character, and in this instance, the character extracting means 6 proceeds to a step SP5.

In this manner, the character extracting means 6 is capable of exactly distinguishing a component of a discrete character from any other special character. The procedure then advances to the step SP5.

Figure 8A:
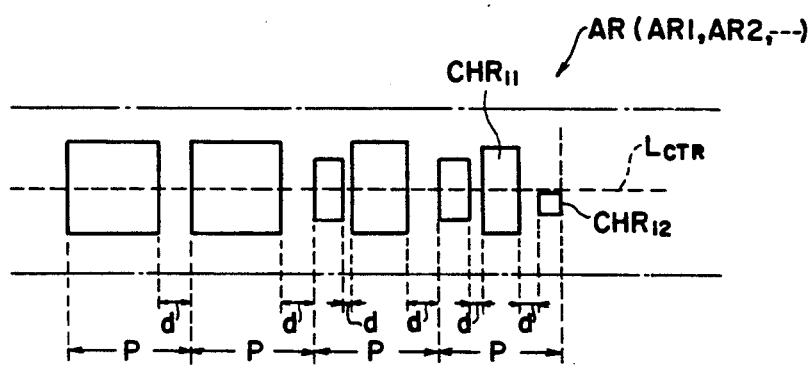

In the step SP5, a decision is made as to whether or not the height-to-width ratio of a next rectangular area adjacent to the rectangular area CHR is greater than 1. In case the result of such decision is negative, this signifies that the rectangular area such as a rectangular area CHAR11 shown in FIG. 8A is followed by a rectangular area having a height-to-width ratio h/w substantially equal to 1 such as a rectangular CHR12 shown in FIG. 8(A).

In this instance, the next rectangular area CHR12 fails to satisfy the condition required for a component of any discrete character, and this signifies that the rectangular area CHR11 which satisfies the condition required for a component of a discrete character is followed by the rectangular area CHR12 which cannot be integrated with the preceding character area CHR11.

Consequently, the character extracting means 6 terminates the processing program in the step SP3 and delivers the input character data S5 indicative of the rectangular area CHR11 to the character discriminator 7.

Figure 8B:
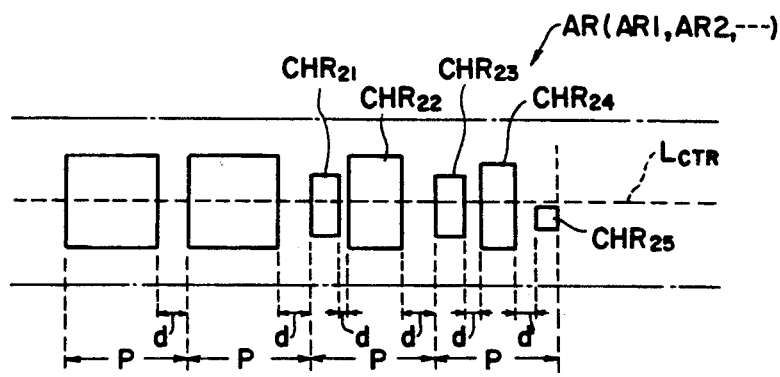

To the contrary, if the result of the aforementioned decision in the step SP5 is affirmative, this signifies that a rectangular area such as a rectangular area CHR22 or CHR24 shown in FIG. 8B following another rectangular area such as a rectangular area CHR21 or CHR23 shown in FIG. 8B satisfies a requirement for a component of a discrete character. The character extracting means 6 thus proceeds to a step SP6.

In the step SP6, a decision is made as to whether or not the extraction position of the following adjacent rectangular area is at the center. This is a confirmation of a second condition that the following rectangular area make a component of a discrete character.

If the result of such decision is negative in the step SP6, this signifies that the following adjacent rectangular area is not astride the center line $L_{CTR}$ as described hereinabove in connection with FIG. 7 and thus signifies that the relevant rectangular area belongs to a special character but not to a component of any discrete character. In this instance, the character extracting means 6 subsequently proceeds to the step SP3 to terminate the processing program and delivers character data indicative of the rectangular area CHR21 or CHR23 being processed for extraction at present in the case of FIG. 8(B) as input character information S5 to the character discriminator 7.

To the contrary, if the result obtained in the step SP6 is affirmative, this signifies that the extraction position of the following rectangular area is astride the center line $L_{CTR}$ as mentioned hereinabove in connection with FIG. 7 and thus signifies that the following adjacent rectangular area satisfies the second condition for a component of a discrete character. In the case of FIG. 8B, for example, the following rectangular area CHR22 or CHR24 adjacent to the rectangular area CHR21 or CHR23 which is being processed at present satisfies also the second condition for a component of a discrete character.

In this instance, the character extracting means 6 proceeds to a step SP7 at which it makes a decision as to whether or not the rectangular area integrated with the following rectangular area presents a smaller pitch than the average character pitch. This is a confirmation of a third condition that the rectangular area which is now being processed make a component of a discrete character.

In case the result of such decision is negative, this signifies that a discrete character formed as a results of integration of the rectangular area with the following rectangular area would have a pitch greater than the average character pitch. This signifies that the integrated character would after all fail to satisfy the final condition for a discrete character.

As described hereinabove in connection with the equation (3), the average character pitch P is calculated on the basis of the square or em characters included in the preceding line to the line which includes the rectangular area being processed now. Practically, however, a character whose pitch is greater than that of a square or em character is not included in a printed document. Therefore, such integration of character areas as would produce a character pitch greater than the average character pitch P must be inhibited.

When the result of the decision in the step SP7 is negative in this manner, the character extracting means 6 proceeds to the step SP3 to terminate the processing program and delivers to the character discriminator 7 input character data S5 which represents that the rectangular area being processed now belongs to an independent character but not to a component of any discrete character.

On the contrary, if the result obtained in the step SP7 is affirmative, this signifies that the integrated character areas satisfy the third condition for a component of a discrete character. Therefore, the character extracting means 6 proceeds to a step SP8 to actually execute an integrating processing of the rectangular area with the following rectangular area and then returns to the aforementioned step SP5.

In the step SP8, the character extracting means 6 integrates, in the case of FIG. 8(B), for example, the rectangular area CHR21 or CHR23 being processed now with the following character area CHR22 or CHR24 based on the ground that a discrete character which may be formed by integration of the rectangular area CHR21 or CHR23 being processed now with the following rectangular area CHR22 or CHR24 would have a character pitch smaller than the average character pitch P.

After then, the character extracting means 6 executes the aforementioned decisions in the steps SP5, SP6 and SP7 with respect to a further following rectangular area adjacent to the integrated rectangular area and, when the results obtained in the steps are all affirmative, the integration processing is executed again in the step SP8. To the contrary, if any one of the results obtained is negative, the extraction processing program is terminated in the step SP3, and discrete character data composed of two or more integrated rectangular areas is delivered as input character data S5 to the character discriminator 7.

By the way, if the character extracting means 6 integrates the rectangular areas CHR21 and CHR22 in FIG. 8B with each other, an affirmative result is obtained in each of the steps SP5 and SP6 with respect to the next rectangular area CHR23. However, if the following rectangular area CHR23 is further integrated, then the resultant character pitch will be greater than the average character pitch P. Consequently, a negative result will be obtained in the step SP7.

This signifies that the rectangular areas CHR21 and CHR22 shown in FIG. 8B cannot be integrated with the following rectangular area CHR23. In this case, the discrete character data obtained by integration of the rectangular areas CHR21 and CHR22 is delivered as input character data S5 to the character discriminator 7 from the character extracting means 6.

To the contrary, in case the character extracting means 6 returns to the step SP5 after integration of the rectangular area CHR24 with the area CHR23 in FIG. 8B, a decision is made in the step SP5 with regard to a height-to-width ratio of a following rectangular area CHR25. In the specific case shown, the height-to-width ratio of the rectangular area CHR25 is substantially equal to 1, and consequently, the character extracting means 6 obtains a negative result in the step SP5. In this case, the character extracting means 6 proceeds to the step SP3 without executing an integrating processing of the rectangular area CHR25 and thus delivers the discrete character data of the rectangular areas CHR23 and CHR24 as input character data S5 to the character discriminator 7.

Figure 8C:
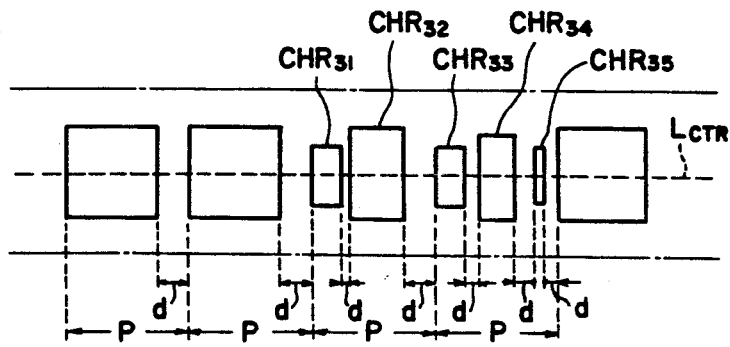

To the contrary, when the character extracting means 6 returns to the step SP5 after successive integrations of rectangular areas CHR31 and CHR32 and further rectangular areas CHR33 and CHR34 as seen in FIG. 8C, an affirmative result is obtained in each of the steps SP5, SP6 and SP7 if the conditions are satisfied that a following rectangular area CHR35 is vertically elongate (i.e. height-to-width ratio h/w>1) and is extracted at a position astride the center line $L_{CTR}$ (FIG. 7) and that the character pitch after integration with the rectangular area CHR35 would be smaller than the average character pitch P. Consequently, the integration process is executed again in the step SP8. Thus, the discrete character data obtained by such integration of the three rectangular areas CHR33, CHR34 and CHR35 to form a single discrete character is delivered as input character data to the character discriminator 7 from the character extracting means 6.

According to the exemplary constitution mentioned above, in execution of the process to extract a discrete character by integrating the rectangular areas of components of such discrete character, the extraction position is adopted, in addition to the height-to-width ratio, as a condition for deciding that the rectangular area to be processed is a component of a discrete character. Accordingly, the extraction accuracy of any discrete character can be further enhanced.

In addition, in the process of integrating a following rectangular area, the integration is executed in such a manner that the height-to-width ratio and the extraction position of the next rectangular area are judged while maintaining the condition that the character pitch after such integration processing never exceeds the average character pitch P. Consequently, the extraction accuracy of a discrete character can be further improved.

The above embodiment has been described with regard to an exemplary case of calculating the average character pitch P in each character row and executing integration of a discrete character by utilizing the average character pitch P obtained in a preceding character row. However, such a modification may be employed that the entire or partial square characters in a character row are used as the data of the average character pitch P for each character row, or else an average character pitch is calculated with respect to partial square or em characters in a preceding character row and is used as the average character pitch data in the relevant character row. Furthermore, the average character pitch data may be calculated with regard to square characters in a plurality of character rows.

In exclusion of any character pitch other than the square character pitch for calculation of an average character pitch in each character row, if a character pitch in a new character row is extremely different from the average character pitch in the preceding character row, the new character row may be regarded as the first character row, and the process of such exclusion may be executed by utilizing the maximum height in the new character row.

In case only a certain number of rows of characters have a different character size such as in an inserted paragraph in a printed document (for example, when a paragraph including one or more rows of characters having an 8-point character size is inserted in a printed document including rows of characters having a 12-point character size), the characters to be excluded from calculation of an average character pitch may be selected with reference to the maximum height in the first character row of the inserted paragraph of the 8-point character rows, which will assure execution of desired extraction of discrete characters with a sufficiently high precision in practical use.

While description has been given only of extraction of horizontally written characters in the foregoing description of the preferred embodiment of the present invention, the extracting procedure can be applied similarly to extraction of vertically written characters. In this instance, a rectangular area having a height-to-width smaller than 1 may be regarded as a component of a discrete character.

Having now fully described the invention, it will be apparent to one of ordinary skill in the art that many changes and modifications can be made thereto without departing from the spirit and scope of the invention as set forth herein.

What is claimed is:

1. A process of recognizing a character comprising the steps of:
    a. electronically scanning a document upon which character information appears in rows and electronically generating a character row signal, which signal represents character string image data;

b. from the character row signal, electronically extracting non-discrete, ordinary characters and special characters in the form of em characters, and further electronically discriminating between discrete characters and components of discrete characters by:
  i. defining a series of rectangular areas which circumscribe a complete character or a component of a discrete character;
  ii. judging whether or not a selected one of the rectangular areas is a component of a discrete character by electronically comparing the ratio of the height of the selected rectangular area to the width of the selected rectangular area with a predetermined height-to-width ratio, and
  iii. electronically comparing the vertical extraction position of the selected rectangular area to a predetermined vertical extraction position to thereby determine if the character within the selected rectangular area is a component of a discrete character;
c. from the results of steps a and b, generating electronic extracted character data representative of the extracted characters; and
d. electronically comparing the extracted character data with a dictionary of stored electronic standard character data, selecting as a recognized character a standard character whose data has the greatest similarity to an extracted character, and outputting electronic data corresponding to the recognized character.

2. A process of recognizing a character as recited in claim 1, wherein when it is electronically determined in steps ii and iii of step b of claim 1 that the first rectangular area circumscribes a component of a discrete character, step b further comprises the steps of:
  iv. electronically determining from the character row signal whether or not a next adjacent rectangular area is another component of the discrete character by repeating steps ii and iii for the next adjacent rectangular area;
  v. electronically determining whether or not the first rectangular area and the next adjacent rectangular area, if integrated together, would exceed a predetermined average character pitch and then electronically combining the next adjacent rectangular area with the first rectangular area to produce an integrated rectangular area if the character pitch of the integrated rectangular area does not exceed the average character pitch, and
  vi. electronically discriminating whether or not the character information extracted from the integrated rectangular area are components of the discrete character by repeating steps ii through v while using the integrated rectangular area as the first rectangular area and subsequently outputting electronic, character image data as that of either a discrete character or as a component of a discrete character.

3. A process of recognizing a character as set forth in claim 1, wherein the predetermined height-to-width ratio is 1.

4. A process of recognizing a character as recited in claim 3, wherein the predetermined vertical extraction position is the vertical center of the character row.

5. An apparatus for recognizing a character comprising:
  a. document reader means for electronically scanning a document upon which character information appears in rows and electronically generating a character row signal, which signal represents character string image data;
  b. character extracting means supplied with the character row signal, for electronically extracting non-discrete, ordinary characters and special characters in the form of em characters, and further electronically discriminating between discrete characters and components of discrete characters by defining a series of rectangular areas which circumscribe a complete character or a component of a discrete character, judging whether or not a selected one of the rectangular areas is a component of a discrete character by comparing the ratio of the height of the selected rectangular area to the width of the selected rectangular area with a predetermined height-to-width ratio, and comparing the vertical extraction position of the selected rectangular area to a predetermined vertical extraction position to thereby determine if the character within the selected rectangular area is a component of a discrete character, and thereafter generating electronic extracted character data representative of the extracted characters; and
  c. character discriminator means for electronically comparing the extracted character data with a dictionary of stored electronic standard character data, selecting as a recognized character a standard character whose data has the greatest similarity to an extracted character, and outputting electronic data corresponding to the recognized character.

6. An apparatus for recognizing a character as recited in claim 5, wherein when the character extracting means electronically determines that the first rectangular area circumscribes a component of a discrete character, the character extracting means further electronically determines from the character row signal whether or not a next adjacent rectangular area is another component of the discrete character by comparing the ratio of the height of the next adjacent rectangular area to the width of the next adjacent rectangular area with a predetermined height-to-width ratio and comparing the vertical extraction position of the next adjacent rectangular area to a predetermined vertical extraction position, electronically determines whether or not the first rectangular area and the next adjacent rectangular area, if integrated together, would exceed a predetermined average character pitch and then electronically combines the next adjacent rectangular area with the first rectangular area to product an integrated rectangular area if the character pitch of the integrated rectangular area does not exceed the average character pitch, and electronically discriminates whether or not the character information extracted from the integrated rectangular area are components of the discrete character by comparing the ratio of the height of the integrated rectangular area to the width of the integrated rectangular area with a predetermined height-to-width ratio and comparing the vertical extraction position of the integrated rectangular area to a predetermined vertical extraction position, and subsequently outputs electronic, character image data as that of either a discrete character or as a component of a discrete character.

7. An apparatus for recognizing a character as set forth in claim 5, wherein the predetermined height-to-width ratio is 1.

8. An apparatus for recognizing a character as recited in claim 7, wherein the predetermined vertical extraction position is the vertical center of the character row.

* * * * *